United States Patent [19]

Witulski et al.

[11] Patent Number: 4,466,041

[45] Date of Patent: Aug. 14, 1984

[54] FAULT PROTECTION SYSTEM FOR POWER SUPPLIES THAT USE FERRO-RESONANT TRANSFORMERS

[75] Inventors: Arthur F. Witulski, Boulder; Bruce R. Schwickrath, Thornton, both of Colo.

[73] Assignee: Storage Technology Corporation, Louisville, Colo.

[21] Appl. No.: 462,742

[22] Filed: Feb. 1, 1983

[51] Int. Cl.³ .............................................. H02H 3/08
[52] U.S. Cl. ..................................... 361/93; 323/248; 361/18; 363/56; 363/75
[58] Field of Search ....................... 361/18, 42, 49, 93, 361/204, 235; 323/248, 251, 306, 309, 332, 334; 363/50, 56, 75, 134; 307/17, 150

[56] References Cited

U.S. PATENT DOCUMENTS

| | | | |
|---|---|---|---|
| 2,987,653 | 6/1961 | Propis | 361/204 X |
| 3,209,238 | 9/1965 | Mierendorf et al. | 361/93 |
| 3,532,934 | 10/1970 | Ballman | 361/93 X |
| 3,733,519 | 5/1973 | Griffey | 361/18 X |
| 3,911,352 | 10/1975 | Slacks | 361/18 X |
| 3,946,301 | 3/1976 | Love | 363/134 X |

FOREIGN PATENT DOCUMENTS

| | | | |
|---|---|---|---|
| 1163955 | 2/1964 | Fed. Rep. of Germany | 361/93 |
| 54-148252 | 11/1979 | Japan | 361/93 |

*Primary Examiner*—Harry E. Moose, Jr.
*Attorney, Agent, or Firm*—Bryant R. Gold

[57] ABSTRACT

A fault detection system for use in power supply systems using ferro-resonant transformers is presented. Current sensing means are used to sense the current flowing in the ferro-resonant circuit associated with operation of the ferro-resonant transformer. A fault detection circuit, powered by its own power supply connected to the primary source of power, monitors the sensed current and signals any significant change therein. A fault condition in any of the secondary circuits of the transformer causes the ferro-resonant current to change, and upon sensing this change, the fault detection circuit disconnects the primary of the transformer from the source of power.

11 Claims, 9 Drawing Figures

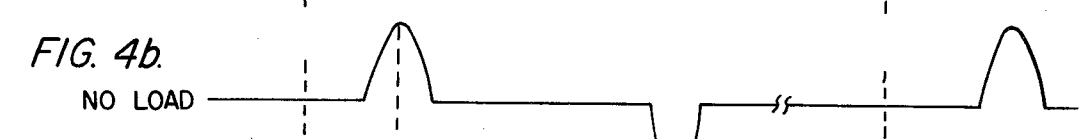
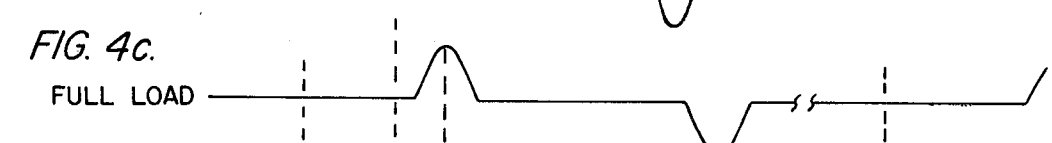
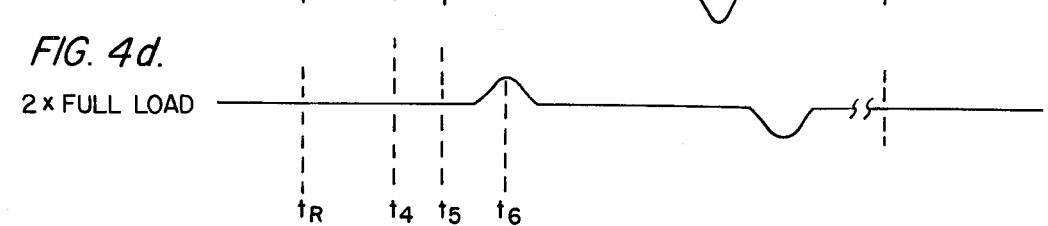
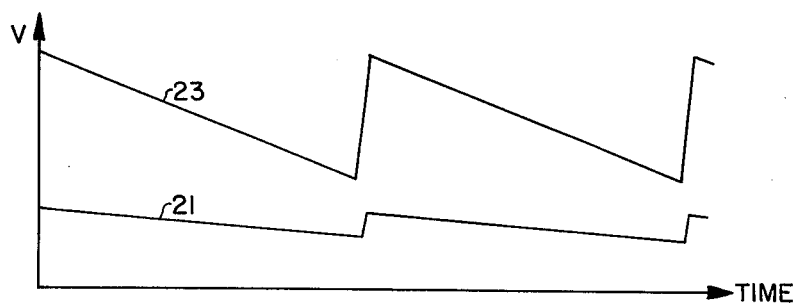
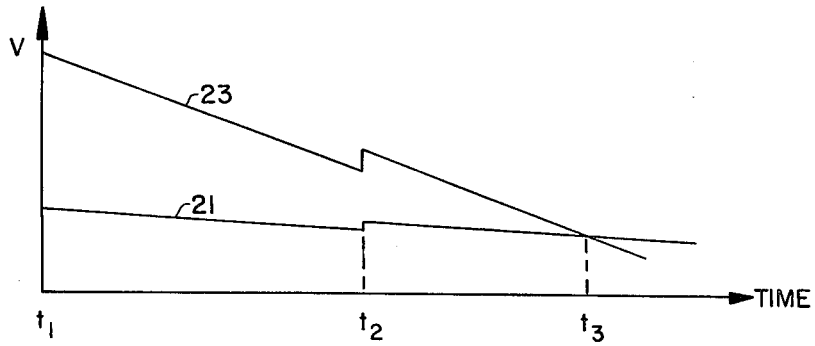

FAULT PROTECTION SYSTEM FOR POWER SUPPLIES THAT USE FERRO-RESONANT TRANSFORMERS

BACKGROUND OF THE INVENTION

This invention relates to power supplies for use with electric and electronic circuits, and more particularly to an improved fault protection means for the secondary circuits of power supplies that use a ferro-resonant transformer. Even more particularly, the invention relates to a means of providing fault protection that does not require the proper operation of any of the secondary circuits in order for the fault protection to operate, does not use fuses or circuit breakers, provides electrical isolation between the secondary circuits and the fault detecting circuit, and can detect a fault on any number of secondary circuits.

An electrical or electronic power supply converts power from an available power source, having voltage and current levels at readily available values, to voltage and current levels having specified values needed for the proper operation of the particular electrical circuit for which the power supply was designed. For example, a power supply may typically convert the standard "line" voltage of 110 volts a.c., 50 or 60 HZ, commonly available at the electrical recepticles of most residential and commercial buildings, to a needed level, such as 5 or 12 volts d.c., having a specified polarity and current capability. The principle component used in most power supplies is the transformer. The transformer has a primary winding that is coupled through primary circuits directly to the line voltage or power source. The transformer also has one or more secondary windings, coupled to the primary circuit only through a magnetic circuit, that provide through suitable secondary circuits the specified voltage and current.

A fault in the secondary circuits of a power supply can be defined as any condition that causes excessive current to be drawn from the power source, which excessive current will likely cause damage to occur to some portion of the secondary circuits or to the primary circuit. The fault may be caused, for example, by a direct electrical short between the positive and negative voltage lines of the secondary circuit; or the fault may be caused by the failure of some component which, while not causing a direct short, causes an excessive amount of current to be drawn from the power source.

Good design practice dictates that the power supply be protected against fault conditions. Such protection not only insures the reliability of the equipment using the power supply, but also complies with the requirements of many governmental agencies, and independent testing laboratories (such as Underwriter's Laboratories, or U.L.) that qualify equipment for safety. Such protection is required to prevent the fault condition from creating an unsafe condition, e.g., a fire or a hazard to operating personnel. Hence, such protection typically consists of some mechanism that automatically disconnects the power supply from the fault, or removes the source of power (e.g., line voltage) from the power supply.

Many methods are known in the prior art that provide fault protection. Exemplary of these prior art methods are such techniques as placing fuses or circuit breakers on the primary side or the secondary side of the transformer; or designing electronic circuitry that monitors the secondary circuits and, when a fault is detected, disconnects the faulty circuitry or removes the power source (line voltage) from the primary.

Unfortunately, all of the fault protection methods of the prior art suffer from one or more inherent disadvantages. For example, it is difficult to select the size of a fuse or circuit breaker that will open fast enough to provide protection in the event of a direct short fault condition while not opening under normal momentary overload conditions of the circuit being protected. Also, some governmental agencies and independent laboratories have a maximum size on the fuse that may be used in a secondary circuit. Not only does this size vary between governmental agencies and independent laboratories, but quite often it is below the normal operating current of the secondary circuit. Thus, in some cases, a fuse may be used in the secondary circuit, only if the equipment is sold in certain areas. In other areas, a different design may be required for the power supply.

Electronic monitoring circuitry on the secondary circuits, such as "current limiting", are also commonly used in the prior art as fault protection methods. These monitoring techniques are well understood by those knowledgeable in power supply art and will not be explained here. They all suffer from the inherent disadvantage, however, of monitoring for a fault condition at some point within the secondary circuit. If a fault occurs beyond that point, i.e., away from the power supply, they can take action to protect the equipment and the power supply. However, should the fault occur inside of the monitoring point, e.g., a short across the secondary winding of the transformer, no protective action is taken.

Other electronic monitoring circuits are known in the art that monitor the current in the secondary circuits and, upon detecting a fault in a particular secondary circuit, disconnect the primary from its source of power, thereby protecting all of the secondary circuits. Unfortunately, such monitoring circuits typically require a direct electrical path between the primary and secondary circuits, and many governmental agencies and independent laboratories require electrical isolation between the primary and secondary circuits. While such electrical isolation can be provided by a variety of techniques, e.g., photo transistor/photo diode isolators or isolation transfomers, such techniques unduly add to the cost and complexity of the power supply.

Further, all of the fault protection devices known in the art, except circuit breakers or fuses in the primary, protect only the secondary circuit that is being monitored. Thus, if the transformer used in the power supply has more than one secondary circuit, as many do, the protection circuitry must be duplicated for each secondary circuit, again adding to the cost and complexity of the power supply.

Thus, it is evident that a need exists in the art for an improved method of fault protection for the secondary circuits of a power supply. Advantageously, the present invention eliminates all the aforementioned disadvantages of the prior art for power supplies that use a ferro-resonant transformer.

SUMMARY OF THE INVENTION

It is an object of the present invention to provide an improved power supply that offers reliable fault protection at minimum cost and without the need for elaborate, expensive fault detection circuitry.

It is a further object of the present invention to provide such a power supply that: (1) provides isolation between the fault protection circuitry and the secondary circuits; (2) provides protection for a plurality of secondary circuits with a single fault detection circuit; (3) meets the requirements of the various governmental agencies and independent testing laboratories that might have jurisdiction over, or influence on, the use of the power supply; and (4) can be easily modified to meet the particular requirements of a given design.

The invention meets the above and other objectives by a means of magnetically coupling a ferro-resonant circuit of the transformer to a single, simple fault detection circuit. The ferro-resonant circuit comprises a separate winding of the transformer, electrically connected in a conventional ferro-resonant manner, that is also magnetically coupled to a current sense circuit. The current sense circuit thereby monitors the current flowing in the ferro-resonant winding. When a fault occurs, this ferro-resonant current changes (in amplitude and phase), and the fault detection circuit, coupled to the current sense circuit, is then able to detect and signal that a change in amplitude and/or phase has occurred, thereby indicating a fault condition. This signal from the fault detection circuit is then used to disconnect the primary of the transformer from the source power (e.g., the line voltage) thereby preventing damage to the power supply, as well as preventing unsafe conditions, such as a fire, from developing.

Advantageously, the fault detection circuit of the present invention further uses its own power supply, connected to the same source as the primary of the transformer, thereby eliminating any dependency on the correct operation of the secondary circuits. Further, the parameters associated with the operation of the ferro-resonant circuit and fault detection circuit are easily modified to meet the specific requirements of the particular power supply to be protected.

BRIEF DESCRIPTION OF THE DRAWINGS

The above and other objects, features and advantages of the present invention will be better understood by reference to the following drawings, wherein:

FIGS. 4a, 4b, 4c, and 4d show representative waveforms associated with operation of the present invention, and include current waveforms in the ferro-resonant winding for a no load condition, (FIG. 4b), full load condition, (FIG. 4c), and two-times full load condition, (FIG. 4d); and FIGS. 5a and 5b show representative signal waveforms associated with operation of the fault detection circuit under normal conditions and during a fault condition, respectively;

DESCRIPTION OF THE PREFERRED EMBODIMENT

The following is a description of the best presently contemplated mode of carrying out the present invention. This description is given only to illustrate the general principles of the invention and is not to be taken in a limiting sense. The true scope of the invention can be ascertained by referring to the appended claims.

The invention is best understood by reference to the drawings, wherein like numbers or letters are used to designate like parts throughout.

Figure 1:
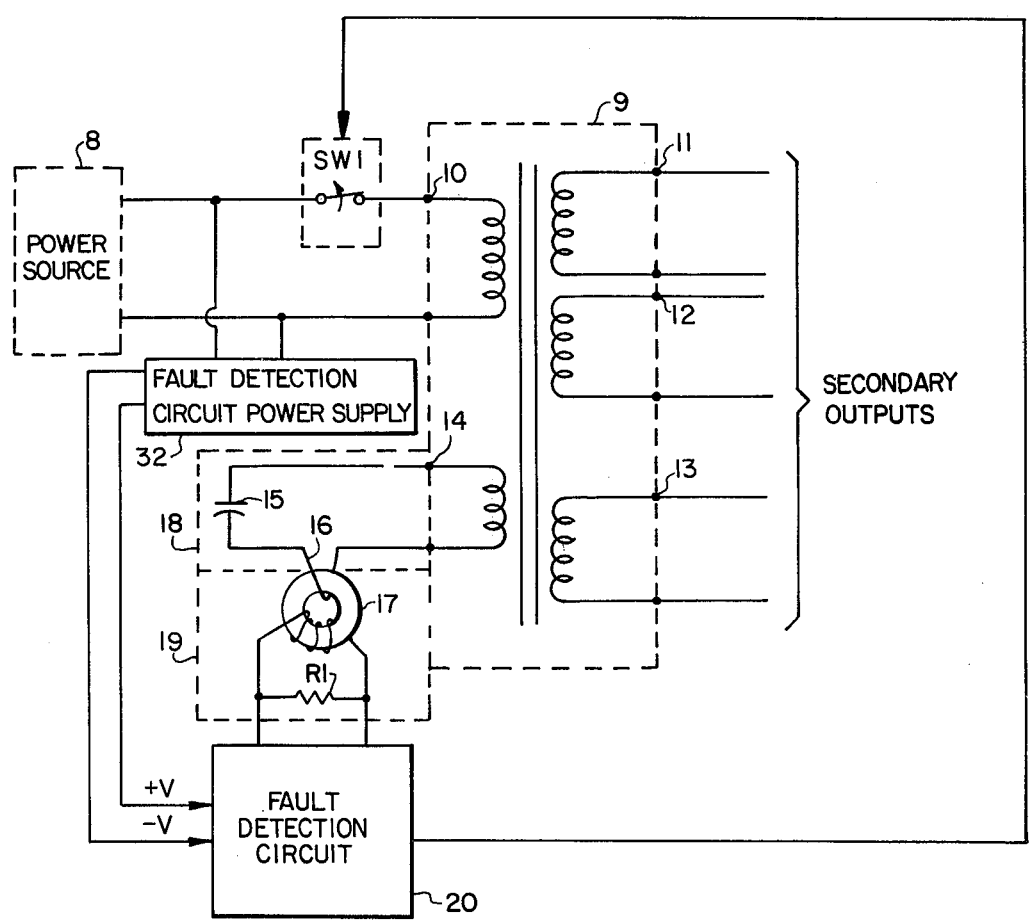
FIG. 1 is a simplified block schematic diagram of the present invention.

FIG. 1 is a block schematic diagram of the present invention and includes a ferro-resonant transformer 9. The transformer comprises a primary winding 10 connected to a power source 8, a multiplicity of secondary windings, shown as three windings 11–13, and a ferro-resonant winding 14. A ferro-resonant circuit 18 includes the ferro-resonant winding 14 connected to a capacitor 15. The theory and operation of ferro-resonant transformers is well understood by those knowledgeable in the art and will not be repeated here.

Coupled to the ferro-resonant circuit 18 is a current sense circuit 19. This current sense circuit 19 includes a current transformer (toroid) 17 that is magnetically coupled to the ferro-resonant circuit 18 by a single turn 16. The single turn 16 consists of a single wire threaded through the center hole of the toroid 17. The current induced in the current transformer 17 develops a voltage across a resistor R1, connected in series with the current transformer winding. This voltage is proportional to the current in the ferro-resonant circuit 18. A suitable switch, SW1, is connected to the primary winding 10 and is used to disconnect the source voltage from the primary when a fault is detected.

The ferro-resonant current sense circuit 19 is coupled to a fault detection circuit 20 that is powered by its own power supply 32. The power supply 32 derives its power directly from the power source 8, thereby ensuring that the fault detection circuit 20 operates independently from the secondary circuits connected to the secondary outputs 11–13.

In operation, the current sense circuit 19 monitors the current in the ferro-resonant circuit 18. If this current changes more than a specified amount, as occurs when a fault condition exists, either in amplitude or phase, the fault detection circuit 20 senses this change and opens the switch SW1, thereby preventing the fault condition from damaging the circuit or creating unsafe operating conditions.

Figure 2:
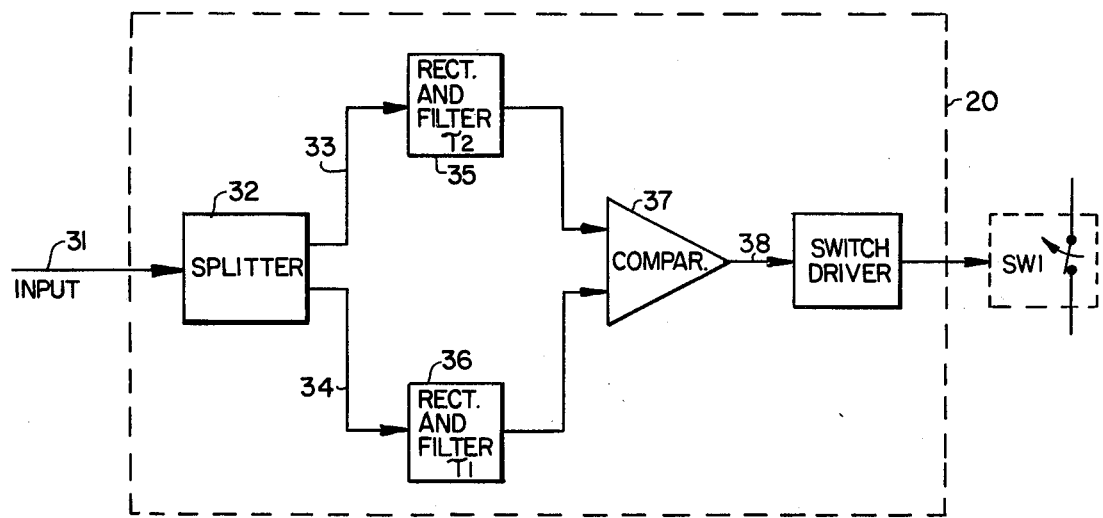
FIG. 2 is a block diagram of one embodiment of the fault detection circuit shown in FIG. 1.

FIG. 2 is a block diagram of one embodiment of the fault detection circuit 20 of FIG. 2. This particular embodiment monitors the amplitude of the input signal, appearing on signal line 31, which input signal is proportional to the current flowing in the ferro-resonant circuit 18. This input signal is buffered, amplified, and split by a signal splitter 32. Thus, separate signals, both representative of the input signal, appear on two separate signal paths 33 and 34. Signal path 33 is connected to a rectifier and filter circuit 35, and signal path 34 is connected to a rectifier and filter circuit 36. The filter of the circuit 35 has a time constant $\tau_2$ associated therewith that is significantly longer than a time constant $\tau_1$ associated with the filter of the circuit 36. The outputs from both filter circuits 35 and 36 are compared in a comparator circuit 37. If one signal exceeds the other, the comparator 37 generates a fault condition signal, appearing on signal line 38, that energizes a switch drive circuit 39. The switch driver circuit 39, in turn, is coupled to the switch SW1, and causes switch SW1 to open in response to the fault condition signal. As will be explained below, by selectively setting the amplitude of the signals appearing on signal lines 33 and 34, one input to the comparator circuit 37 will always exceed the other in the absence of a fault condition. However, if a fault occurs, this relationship no longer exists, and the fault condition signal is generated.

Figure 3:
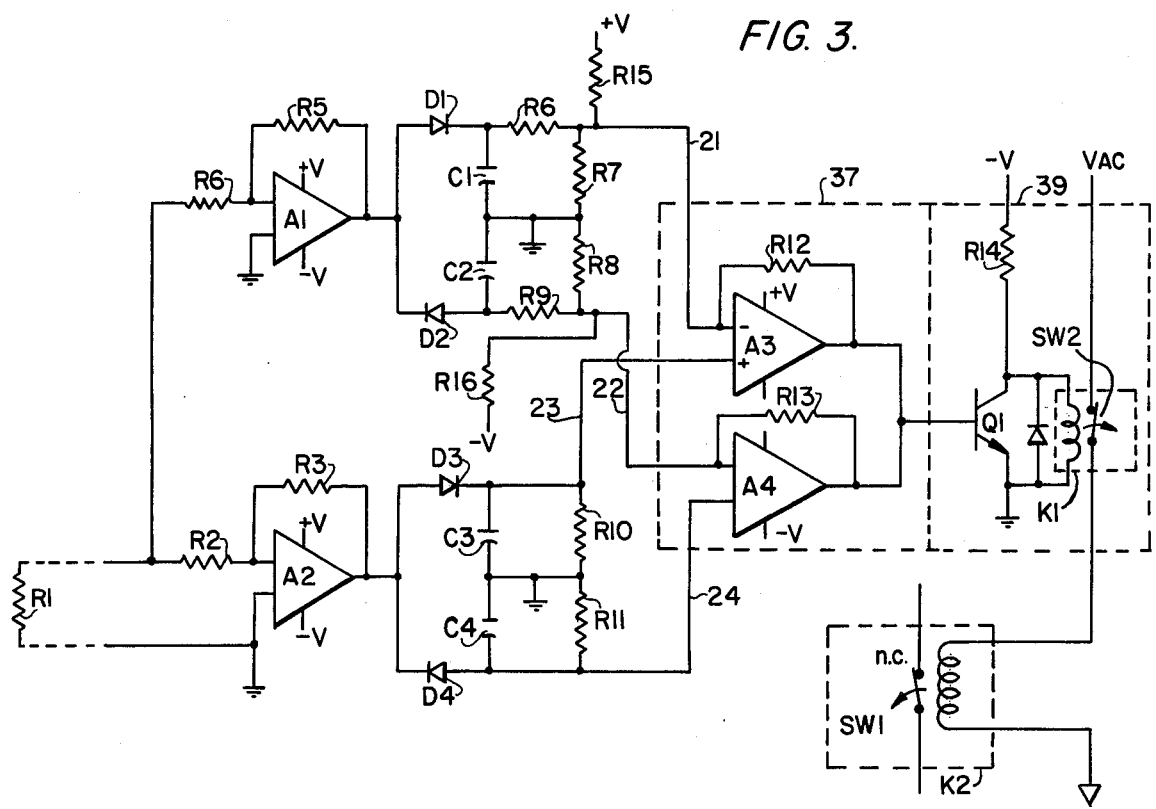
FIG. 3 is a schematic drawing of one embodiment of the block diagram of FIG. 2.

FIG. 3 is a schematic drawing of a preferred embodiment of the fault detection circuitry 20 of the present invention. The imput signal is the voltage developed across the resistor R1. This voltage is amplified by the two amplifiers A1 and A2. The outputs of the two amplifiers, A1 and A2, are rectified by the diode pairs D1, D2 and D3, D4, respectively. RC filter networks R6-R7-C1 and R8-R9-C2 filter the rectified output voltage from diodes D1, D2; while filter networks R10-C3 and R11-C4 filter that of diodes D3, D4.

Each RC network output, appearing on signal lines 21-24, is connected to an input of the two additional amplifiers A3 or A4. (Hereafter, the signals appearing on signal lines 21-24 will be referred to as the signals 21-24, respectively.) The filter output signals 21-24 are connected such that each of the amplifiers A3 and A4 has input signals of the same polarity. The amplifiers A3 and A4 function as the comparator circuit 37 of FIG. 2. When the two input signals on either amplifier fail the input test, as will be explained below, a fault condition has occurred in one of the secondary circuits of the transformer, and the transistor Q1 is turned on. When transistor Q1 turns on, the voltage across the coil of relay K1 drops to zero, causing the switch contacts of SW2 (the switch included in relay K1) to open. When switch SW2 opens, the coil of a second relay K2 is de-energized, causing the switch SW1 to open. This action, in turn, disconnects the power source 8 from the primary winding 10 (see FIG. 1) of the ferro-resonant transformer 9. It is to be noted that while particular embodiments of the switch driver circuit 39 and comparator circuit 37 (FIG. 2) have been disclosed in FIG. 3, any equivalent circuitry could be used. The only essential requirement is that the switch SW1 open, thereby disconnecting the power source 8 from the primary winding 10, in response to a fault condition signal generated by the comparator circuit 37.

A simple power supply circuit 32 supplies the voltages (+V and −V) required by the fault detection circuit 20. This power supply is connected to the same power source 8 as the ferro-resonant transformer 9, and thus the fault detection circuitry does not rely upon the correct functioning of any of the secondary circuits in order to operate. The power supply circuit 32 may be of any conventional design.

Advantageously, the amplifiers A1, A2, A3, and A4 may be realized using commercially available integrated circuits, such as the quad amp MC3403, manufactured by Motorola. Transistor Q1 is a type 2N2222 transistor (manufactured by Motorola). In order to further simplify the realization of the fault detector circuit 20, the resistors R2-R13 may be obtained from a resistor pack (a small package, similar to an integrated circuit package, containing a plurality of resistors).

In operation, the voltage developed across resistor R1 will take on positive and negative peaks as shown in FIGS. 4b-4d, indicating that the current in the ferro-resonant circuit 18 alternately peaks between positive and negative values. Under no load conditions (i.e., the secondary circuits drawing no current), FIG. 4b represents the type of waveform obtained. Under full load conditions, the ferro-resonant current peaks decrease noticeably in amplitude and shift in phase from the no load position, as shown in FIG. 4c. If the load exceeds the full load condition, these current peaks decrease even more significantly in amplitude and shift even more in phase as indicated in FIG. 4d, which represents a two-times full load condition. FIG. 4a represents a timing pulse associated with the line voltage (power source 8) frequency.

As explained, the amplifying circuits A1 and A2 amplify the voltage developed across resistor R1. This amplified voltage is then rectified by either the rectifying circuit D1-D2 (amplifier A1) or the rectifying circuit D3-D4 (amplifier A2). The values of capacitors C1-C2 and C3-C4 are selectively chosen in combination with the associated resistor values to give the output signals of each rectifying circuit, appearing on signal lines 21-24, desired time constants. More particularly, C3, R10 and C4, R11 are chosen to give the output signals 23 and 24 a much shorter time constant than the output signals 21 and 22. To illustrate, FIG. 5A depicts the voltage waveforms on the inputs of the amplifier A3 (the rectified output signals appearing on lines 21 and 23). Since the fault detection circuit is symmetrical, only that half associated with A3 is explained here. The operation of the circuitry associated with amplifier A4 is the same. The waveforms shown are the output 23 of the RC network R10, C3 and the output 21 of the RC network R6, R7, C1.

In the embodiment shown in FIG. 3, amplifiers A1 and A2 are designed to have approximately the same gain in order to keep the design simple and to make the realization of the circuit as cost effective as possible. Resistors R6 and R7 act as a voltage divider to cause the normal amplitude of waveform 21 to be lower than that of waveform 23. The values of the capacitors C1 and C3 and/or the values of resistors R6-R7 and R10, respectively, are chosen to give waveform 23 a much shorter time constant, and therefore a much more rapid rate of decay, than that of waveform 21. As long as waveform 23 is more positive than waveform 21, the output of the amplifier A3, which may be thought of as a fault condition signal, will be negative and the transistor Q1 will be turned off. If waveform 23 becomes less positive than waveform 21, the output of amplifier A3 will switch positive, indicating a fault condition has occurred, turning on transistor Q1; which, in turn, causes switch SW1 to open.

Resistors R15 and R16 are pull-up and pull-down resistors, respectively, and protect against faults that would prevent voltages from developing on C1 and C2.

FIG. 5b shows the same waveforms 23 and 21 when a fault condition occurs between times t1 and t2, in one of the secondaries 11-13. As explained, when a fault occurs, the current in the ferro-resonant circuit 18 decreases, causing the voltage developed across R1 to be smaller. At time t2, the capacitors C1 and C3 do not charge to their normal value; and at time t3, waveform 23, with its more rapid rate of decay, becomes less positive than waveform 21. Transistor Q1 thus turns on at time t3, and this causes the switch SW1 to open, thereby disconnecting the power source 8 from the primary input 10.

Those skilled in the art will recognize many alternative, but equivalent, circuit configurations that could be employed in lieu of that shown in FIG. 3. For example, rather than using the voltage divider networks R6-R7 and R8-R9 to decrease the amplitude of the signals 21 and 23, the gain of amplifier A1 could be decreased (by selecting appropriate values of resistors R5, R6) to achieve the same function. Alternatively, if amplifier A2 has sufficient output drive capacity to drive both rectifier circuits, amplifier A1 could be eliminated, and the output of amplifier A2 could be connected to both rectifying circuits D1-D2 and D3-D4.

It is to be further understood that the fault detection circuit is not restricted to the embodiment described above in FIGS. 2 and 3. For example, as explained, FIG. 4b shows the voltage waveform across resistor R1 for a no load condition on the ferro-resonant transformer. FIGS. 4c and 4d show the same waveform for a maximum load condition and a two-times maximum load condition, respectively. These waveforms have changed not only in amplitude from that shown in FIG. 4b, but also in phase. Thus, this phase shift could also be monitored to detect a fault condition. For example, in one measurement made, using the time t4 as a reference, time t5 has shifted approximately 25-degrees, while time t6 shifted approximately 65-degrees. Thus, an alternate embodiment of the fault detection circuit 20 would be to use the voltage waveform of the source voltage as a reference (FIG. 4a or equivalent) and to monitor the phase shift of the voltage waveform across resistor R1. When the phase shift becomes too large, e.g., 40 to 60 degrees, as determined by the type of fault being protected against, the fault detection circuit could disconnect the primary input from its power source. Such a phase detection circuit could be readily built by those skilled in the art.

As thus described, the present invention, by monitoring the current in the ferro-resonant circuit, provides a simple yet effective fault detection means. Moreover, a variety of embodiments can be used, and they can each be easily tailored to meet a given application by simply adjusting circuit parameters, such as RC time constants.

What is claimed is:

1. In a power system which uses a ferro-resonant transformer, a fault detection system comprising:
    a ferro-resonant transformer having a primary winding connected to a source of power, at least one secondary winding connected to respective secondary circuis, and a ferro-resonant winding connected to a capacitor to form a ferro-resonant circuit;
    means for monitoring the current flowing in said ferro-resonant circuit;
    detection circuitry coupled to said ferro-resonant current monitoring means for generating a fault condition signal whenever said ferro-resonant current changes by at least a predetermined amount;
    power supply means for supplying power to said fault detection circuit; and
    disconnect means for disconnecting said primary winding from said source of power in response to said fault condition signal.

2. The fault detection system as defined in claim 1 wherein said ferro-resonant current monitoring means comprises a current transformer that is magnetically coupled to said ferro-resonant circuit.

3. The fault detection system as defined in claim 2 wherein said detection circuitry is electrically isolated from said ferro-resonant transformer and said secondary circuits.

4. The fault detection system as defined in claim 1 wherein said detection circuitry monitors the phase of said ferro-resonant current.

5. The fault detection system as defined in claim 4 wherein said fault condition signal is generated whenever the phase of said ferro-resonant current shifts in excess of 40 degrees.

6. The fault detection system as defined in claim 1 wherein said detection circuitry monitors the amplitude of said ferro-resonant current.

7. The fault detection system as defined in claim 6 wherein said detection circuitry comprises:
    means for generating a first signal proportional to the value of said ferro-resonant current;
    separating means for splitting said first signal into second and third signals;
    rectifying means for rectifying said second and third signals, thereby generating respective rectified signals;
    first filter means for filtering said second rectified signal in a filter having a first time constant, said second rectified signal thereby comprising a first filtered signal after the filtering thereof;
    second filter means for filtering said third rectified signal in a filter having a second time constant, said second time constant being shorter than said first time constant, said third rectified signal thereby comprising a second filtered signal after the filtering thereof, whereby said second filtered signal decays at a faster rate than said first filtered signal;
    amplitude setting means for setting the amplitude of said first filtered signal at a value less than the amplitude of said second filtered signal under normal, no-fault, operating conditions; and
    comparison means for comparing the amplitude of said first filtered signal to said second filtered signal and for generating said fault condition signal whenever the amplitude of said second filtered signal is less than the amplitude of said first filtered signal.

8. A fault detection means for use in the power system comprising a ferro-resonant transformer having a primary winding connected to an a.c. power source, at least one secondary winding connected to respective secondary circuits, and a ferro-resonant winding connected so as to form a ferro-resonant circuit, said method comprising the steps of:
    (a) monitoring the current flowing in said ferro-resonant circuit;
    (b) generating a fault condition signal whenever said current monitored in step (a) changes by a prescribed amount; and
    (c) disconnecting said a.c. power source from said primary winding in response to said fault condition signal.

9. The fault detection method as defined in claim 8 wherein said fault condition signal generated in step (b) is generated in response to a phase shift of said ferro-resonnant current that exceeds a predetermined amount.

10. The fault detection method as defined in claim 8 wherein said fault condition signal generated in step (b) is generated in response to an amplitude change of said ferro-resonant current that exceeds a predetermined amount.

11. The fault detection method as defined in claim 10 wherein the amplitude change of said ferro-resonant current is sensed by:
    (1) generating a first signal proportional to said current;
    (2) splitting said first signal into two separate signals;
    (3) rectifying and filtering one of said separated signals so as to form a first filtered signal, said first filtered signal having a first time constant associated therewith as a result of said filtering;
    (4) rectifying and filtering the other of said separated signals so as to form a second filtered signal, said second filtered signal having a second time constant associated therewith as a result of said filtering, said second time constant being shorter than said first time constant, whereby said second filtering signal decays at a faster rate than said first filtered signal;

(5) adjusting the relative amplitudes of said first and second filtered signals so that said second filtered signal is always greater than said first filtered signal under normal no-fault operating conditions;

(6) generating said fault condition signal only if the amplitude of said first filtered signal exceeds the amplitude of said second filtered signal.

* * * * *